US012388184B2

(12) United States Patent
Yousefbeiki et al.

(10) Patent No.: US 12,388,184 B2
(45) Date of Patent: Aug. 12, 2025

(54) ANTENNA ARRANGEMENT

(71) Applicants: AGC GLASS EUROPE, Louvain-la-Neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

(72) Inventors: Mohsen Yousefbeiki, Gosselies (BE); Rafik Addaci, Gosselies (BE)

(73) Assignees: AGC GLASS EUROPE, Louvain-la-Neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 116 days.

(21) Appl. No.: 18/252,204

(22) PCT Filed: Nov. 16, 2021

(86) PCT No.: PCT/EP2021/081827
§ 371 (c)(1),
(2) Date: May 9, 2023

(87) PCT Pub. No.: WO2022/101498
PCT Pub. Date: May 19, 2022

(65) Prior Publication Data

US 2023/0411855 A1 Dec. 21, 2023

(30) Foreign Application Priority Data

Nov. 16, 2020 (EP) .................................... 20207878

(51) Int. Cl.
*H01Q 1/12* (2006.01)
*H01Q 1/38* (2006.01)
(Continued)

(52) U.S. Cl.
CPC ........... *H01Q 9/045* (2013.01); *H01Q 1/1271* (2013.01); *H01Q 1/38* (2013.01); *H01Q 1/42* (2013.01)

(58) Field of Classification Search
CPC ........ H01Q 9/045; H01Q 1/1271; H01Q 1/38; H01Q 1/42; H01Q 1/007
See application file for complete search history.

(56) References Cited

U.S. PATENT DOCUMENTS

2018/0316365 A1* 11/2018 Völkel ................ H01Q 15/0013
2021/0005951 A1 1/2021 Horie et al.

FOREIGN PATENT DOCUMENTS

FR 2 981 930 5/2013
WO WO 2012/153663 A1 11/2012
WO WO 2019/177144 A1 9/2019

OTHER PUBLICATIONS

International Search Report Issued Feb. 24, 2022, in PCT/EP2021/081827, filed on Nov. 16, 2021, 3 pages.

* cited by examiner

*Primary Examiner* — David E Lotter
(74) *Attorney, Agent, or Firm* — Oblon, McClelland, Maier & Neustadt, L.L.P.

(57) ABSTRACT

An antenna arrangement includes a first transparent dielectric panel and a second transparent dielectric panel. The second transparent dielectric panel is in front of the first transparent dielectric panel and separated by at least one panel interlayer from the first transparent dielectric panel. The antenna arrangement further includes a patch network attached and separated by at least one patch interlayer from the first transparent dielectric panel, a feeding network attached and separated by at least one feed interlayer from
(Continued)

the second transparent dielectric panel defining a distance Dpf between the patch network and the feeding network and a ground plane.

21 Claims, 1 Drawing Sheet

(51) Int. Cl.
*H01Q 1/42* (2006.01)
*H01Q 9/04* (2006.01)

ANTENNA ARRANGEMENT

This application is a 371 application of PCT/EP2021/081827 filed Nov. 16, 2021 and claims benefit of EP 20207878.8, filed Nov. 16, 2020. The contents of each of these applications are incorporated herein by reference.

TECHNICAL FIELD

The present invention relates to an antenna arrangement in general and, more specifically, to an enhanced performance aperture-coupled or proximity coupling planar antenna arrangement, to optimize the transmission and/or the reception of the radio-frequency signal.

Thus, the invention concerns multiple domains where an antenna arrangement is used.

BACKGROUND ART

Mobile data traffic is increasing continuously and will boom significantly with 5G, putting mobile network operators under CAPEX pressure. Higher frequency bands for 5G mean more challenges for coverage deployment, especially in dense urban areas where capacity will be needed and strict EMF limitations apply. The deployment of small cells are described as a good solution for capacity improvement which requires to install a large number of antennas in order to stably perform electromagnetic wave transmission and reception. However, many drawbacks limit the deployment of small cells. First, it is very difficult to find location for new antennas. Second, bringing fiber and electricity outdoor is costly. Finally, urbanistic regulations may limit possibilities for small cells.

On the other hand, In recent years with miniaturization, antennas are increasingly installed in buildings. When installing the antenna in the building, it is necessary to select the proper placement of the antenna so that electromagnetic waves can be transmitted and received stably while preventing the appearance of the building from being impaired.

U.S. Pat. No. 5,355,143 describes a planar antenna having three conductive layers: a patch network, a ground and feeding network. The planar antenna can be integrated into a façade of a building using the glass panel as a carrier. The issue with such planar antennas, because integrated into the façade, is that at least the electrical connection, the installation and the maintenance is complicated and impossible to manage once the façade is on the building. On top of that, performance parameters of the planar antenna is limited by thicknesses of the components of the façade, such as glass panels, spacers, etc.

Therefore, with such planar antennas is not possible to change the frequency band or the optimize the transmission and/or reception of the antenna to meet the requirement of current and future communication systems.

SUMMARY OF INVENTION

The present invention relates, in a first aspect, to an antenna arrangement comprising a first transparent dielectric panel and a second transparent dielectric panel. The second transparent dielectric panel is in front of the first transparent dielectric panel and separated by at least one panel interlayer from the first transparent dielectric panel.

The antenna arrangement further comprises a patch network attached and separated by at least one patch interlayer from the first transparent dielectric panel, a feeding network attached and separated by at least one feed interlayer from the second transparent dielectric panel defining a distance Dpf between the patch network and the feeding network. A distance Dpg can also be defined between the patch network and the ground plane.

The solution as defined in the first aspect of the present invention is based on that the at least one patch interlayer is a transparent polymer interlayer.

The present invention relates, in a second aspect, to a method to assemble an antenna arrangement according to the first aspect wherein the method comprises following steps:

A. assembling the patch network on the first transparent dielectric panel,

B. assembling the feeding network on the second transparent dielectric panel, then C. Assembling the first transparent dielectric panel and the second transparent dielectric panel together with a panel interlayer It is noted that the invention relates to all possible combinations of features recited in the claims or in the described embodiments.

The following description relates to building applications but it's understood that the invention may be applicable to others fields like automotive or transportation applications.

BRIEF DESCRIPTION OF THE DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DETAILED DESCRIPTION

Figure 1:
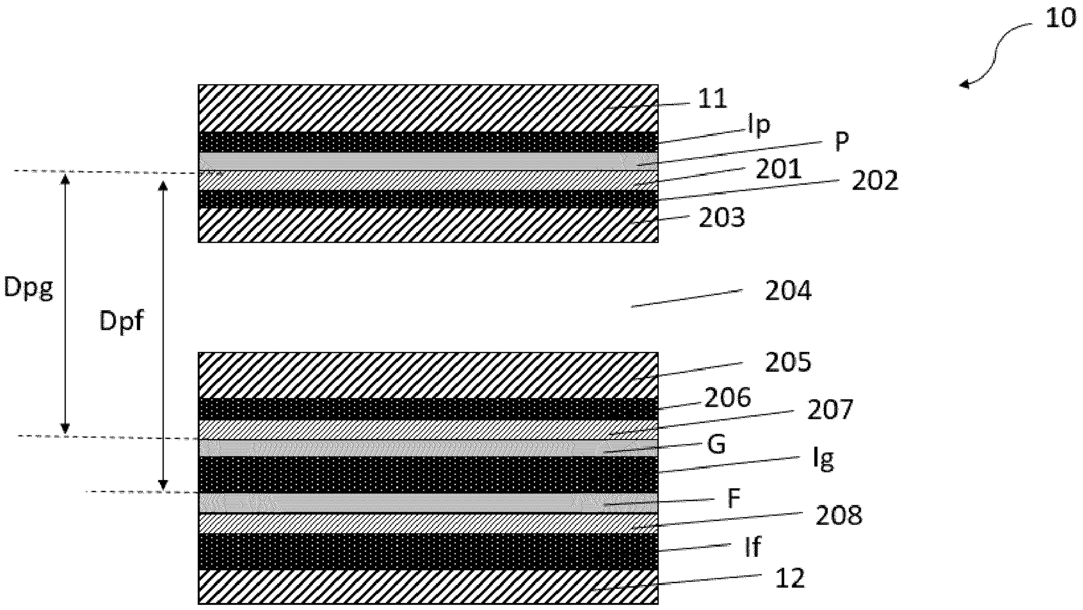
FIG. 1 is a schematic sectional view of antenna arrangement according to a first embodiment of the invention.

It is an object of the present invention to alleviate the above described problems and to remove the barriers to outdoor 4G and 5G network densification. Especially, the object of the first aspect of the present invention is to have installation, preferably indoor installation, of the antenna arrangement, eliminating the need for scaffolding or foundation work in the street. Another advantage of the present invention is that transparent antenna enables seamless indoor or outdoor placement in line with urban aesthetics and EMF constraints.

According to a first aspect of the invention, the invention relates to antenna arrangement 10 comprising a first transparent dielectric panel 11 and a second transparent dielectric panel 12. The second transparent dielectric panel 12 is in front of the first transparent dielectric panel 11 and separated by at least one panel interlayer 204, 302 from the first transparent dielectric panel 11.

The antenna arrangement has typically a width and/or a length comprised between 20 mm to 600 mm for example a rectangular shape of 210 mm×250 mm, a rectangular shape of 150 mm×160 mm or rectangular shape of 255 mm×500 mm depending of the operating frequencies, the number of elements comprised in the antenna arrangement and/or the transparency design.

Preferably, the antenna arrangement works for 4G and/or 5G, meaning wavelengths with frequencies from 690 MHz to 70 GHz.

The term "in front of" denotes that the first transparent dielectric panel is facing the antenna system front face, the second transparent dielectric panel is facing the first transparent dielectric panel.

The term "transparent" denotes a property illustrating the average TL (light transmission) of visible light transmitted through a material in the visible spectrum of at least 1%. Preferably, transparent relates to a TL property of at least 10%. More preferably, transparent denotes a TL of at least 50%. Ideally, transparent denotes a TL of at least 70%.

A dielectric panel is a panel that is not electrically conductive.

The first 11 and the second 12 transparent dielectric panels can have different chemical composition, such as plastic-based composition. The plastic-based composition can be PET, polycarbonate, PVC or any other transparent dielectric plastic-based that can be used as a panel.

Preferably, the first and/or the second transparent dielectric panel comprises a glass panel to protect the antenna arrangement and the antenna system from scratches. The glass panel can comprises at least 50% in weight of SiO2 such as glass like soda lime glass, aluminosilicate glass or borosilicate glass.

In some embodiments, the first and the second transparent dielectric panels have the same chemical composition to reduce the handling and the process of manufacturing.

Preferably, the first and the second transparent dielectric panels can have a loss tangent equals to or smaller than 0.03 and more preferably the loss tangent of the dielectric panels is equal to or smaller than 0.02 and more preferably the loss tangent of the dielectric panels is equal to or smaller than 0.01 to reduce the energy loss in panels while increasing the antenna system efficiency.

In preferred embodiments, the first and the second transparent dielectric panels have a loss tangent equals to or smaller than 0.005 and more preferably the loss tangent of the dielectric panels is equal to or smaller than 0.003 to reduce the energy loss in panels while increasing the antenna system efficiency.

Preferably, the first and the second transparent dielectric panels are borosilicate glass panels to reduce the loss tangent to a value equals to or is smaller than 0.01.

The dielectric panels can be manufactured by a known manufacturing method such as a float method, a fusion method, a redraw method, a press molding method, or a pulling method. As a manufacturing method of the glass panel, from the viewpoint of productivity and cost, it is preferable to use the float method.

Each transparent dielectric panel can be independently processed and/or colored, . . . and/or have different thickness in order to improve the aesthetic, safety, . . . .

Each transparent dielectric panel can be processed, i.e. annealed, tempered, . . . to respect the specifications of security requirements. The transparent dielectric panel can independently be a clear or a colored transparent dielectric panel, tinted with a specific composition or by applying an additional coating or a plastic layer for example.

The first 11 and the second 12 transparent dielectric panels can have any shape. The shape of the transparent dielectric panels 11, 12 in a plan view is not limited to a rectangle and may be a trapeze, a triangle, a square, a circle or the like.

In some embodiments, to provide an transmission and/or reception of at least an operating frequency through a window as discrete as possible, the antenna arrangement can be placed in front of the window. Preferably, the antenna arrangement radiates towards a specific direction through the first transparent dielectric panel 11 to emit and/or receive through the window and to cover terminals outside a building for instance. In such embodiments, the first transparent dielectric panel 11 and/or the second transparent dielectric panel 12 can be mounted in front of the window.

In some embodiments, the antenna arrangement radiates towards a specific direction through the side opposite to the first transparent dielectric to emit and/or receive at the opposite direction of the window and to cover terminals inside a building for instance.

In some embodiments, the antenna arrangement radiates towards the two specific directions to emit and/or receive through the window and through the opposite side and to cover terminals outside and inside a building for instance.

In some embodiments, the first dielectric panel is fixed to the external surface of the window by an fixing means. The fixing means can be a glue, an plastic interlayer, a suction pad or any other means able to fix an antenna arrangement on a surface of a window.

The antenna arrangement can be assembled in an antenna housing to be mounted in front of the window and/or to adapt the distance between the antenna arrangement and the window and/or to adapt distances between components of the antenna arrangement.

In some embodiments, the antenna arrangement can comprise an installation interface panel located between the first dielectric panel 11 and the window. The installation interface panel permits to cancels out the impact of the installation medium/media on the antenna system performance and permits to maintain the impedance response of the antenna as well as the radiation properties of the antenna within the specifications. In some embodiments, the installation interface panel can add more functionalities to the antenna system, such as the beam steering or beam shaping.

The installation interface panel 14 can comprise at least a transparent dielectric panel such as glass and/or plastic. In some embodiments. At least a conductive pattern can be deposited on at least one of dielectric panels.

Preferably, the installation interface panel 14 is parallel to the antenna arrangement to simplify the design and fabrication of the installation interface panel while optimizing the transmission and/or the reception of the signal.

The antenna arrangement 10 also comprises a patch network P attached and separated by at least one patch interlayer Ip from the first transparent dielectric panel 11.

The at least one patch interlayer Ip is a polymer interlayer. Preferably, transparent polymer interlayer can be polyvinyl butyral (PVB), ethylene-vinyl acetate (EVA), polymethyl methacrylate (PMMA), a polycarbonate (PC), a polystyrene (PS), a polyvinyl chloride (PVC), a polyamide (PA), a polyetherimide (PEI), a polyethylene terephthalate (PET), a polyurethane, an acrylonitrile butadiene styrene copolymer (ABS), a styrene acrylonitrile copolymer (SAN), a styrene methyl methacrylate copolymer (SMMA) and any mixtures of these, a crosslinked resin, an ionoplast, an ionomer, a cyclo-olefin polymer (COP), cyclo-Olefin copolymer (COC) or an Optical Clear Adhesive (OCA).

Crosslinked or cured resins are known to the skilled person and are three dimensional polymer networks obtained by the crosslinking/curing of low molecular weight species either by reaction with a curing agent also known as crosslinker or upon exposure to heat, UV radiations (UV) or electron beam (EB). Non exhaustive examples of crosslinked resins are epoxy resins, polyurethane resins, UV or EB curable resins. In the present invention, the precursors of the crosslinked resin may be transparent or not provided that the crosslinked resin is transparent.

Remark that some polymer mixtures, copolymers and some semi-crystalline polymers can be opaque and non-transparent due to a dispersed phase or due to the presence of crystallites. Hence it is possible that not all compositions of the listed polymers mentioned above are transparent. The person skilled in the art is capable to identify what composition is transparent and hence identify if a given polymer falls within the claimed transparent polymers.

It is understood that the patch network P can be attached to any of the surfaces of the first transparent dielectric panel 11. Preferably the patch network P is attached to the surface opposite to the surface facing the window to achieve a higher antenna performance and in parallel to protect the patch network P from the exterior attack, such as moisture, scratches, . . . , as illustrated in FIG. 1.

In some embodiments, the patch network P comprises at least one resonating conductive element. Preferably, the length of the conductive element is equivalent to the half of the effective wavelength at the operation frequency.

Preferably, the dimensions of the surface of the patch network is smaller than the surface of the first transparent dielectric panel.

In some embodiments, several patch networks can be attached to the first transparent dielectric panel to have an antenna system transmitting and/or receipting same or different frequencies. In such embodiments, patch networks are electrically isolated from each other.

The conductive element of the patch network can have any shape such as a rectangular shape. In some embodiments in which the dual-polarized operation is desired, a circular or square shape is preferred. Preferably, the patch network is conductive patch network.

The patch network can be printed, glued, coated on the patch interlayer or placed by any other methods able to non-removably place a patch network on an interlayer on such as screen-printing, inkjet printing, deposition, glued wire, copper foil, copper mesh, etc.

In some embodiments, the patch network can printed, glued, coated on a transparent layer to facilitate the attachment to the first transparent dielectric panel with the patch interlayer and the handling. Such transparent layers are preferably transparent polymer film. Preferably, transparent polymer film can be polyvinyl butyral (PVB), ethylene-vinyl acetate (EVA), polymethyl methacrylate (PMMA), a polycarbonate (PC), a polystyrene (PS), a polyvinyl chloride (PVC), a polyamide (PA), a polyetherimide (PEI), a polyethylene terephthalate (PET), a polyurethane, an acrylonitrile butadiene styrene copolymer (ABS), a styrene acrylonitrile copolymer (SAN), a styrene methyl methacrylate copolymer (SMMA) and any mixtures of these, a crosslinked resin, an ionoplast, an ionomer, a cyclo-Olefin copolymer (COC), cyclo-Olefin polymer (COP) or an Optical Clear Adhesive (OCA).

Material of the patch network can be metal-based material such as Copper, Silver, conductive metal alloys with or without plated material, such as gold, or any other material able to be electrically conductive and able to be placed on a patch interlayer or on a transparent layer.

The transparent antenna arrangement 10 also comprises a feeding network F attached and separated by at least one feed interlayer If from the second transparent dielectric 12.

The distance Dpf is defined between the patch network and the feeding network. Preferably, this distance is substantially comprises between 40 and 100 mm, more preferably is substantially comprises between 45 and 8 mm, and much more preferably is substantially comprises between 48 and 68 mm.

It is understood that the feeding network F can be attached to any of the surfaces of the second transparent dielectric panel 12. Preferably the feeding network F is attached to the surface facing the first transparent dielectric panel 11 meaning that the surface facing also the antenna system front face 31 to protect the feeding network F from the exterior attack, such as moisture, scratches, . . . , as illustrated in FIG. 1.

In some embodiments, the feeding network comprises at least one conductive element to transfer the signal between the antenna system input and the patch network. Preferably, the width of the feeding network at the input side is in such a way to provide a characteristic impedance of about 50 Ohms.

In some embodiments in which that there are two or more conductive elements in the patch network per each antenna system input, the feeding network can distribute the energy among those above-mentioned conductive elements.

The feeding network can be printed, glued, coated on the feed interlayer or placed by any other methods able to non-removably place a feeding network on an interlayer on such as screen-printing, inkjet printing, deposition, glued wire, copper foil, copper mesh, etc.

In some embodiments, the feeding network can printed, glued, coated on a transparent layer to facilitate the attachment to the second transparent dielectric panel with the feed interlayer and the handling. Such transparent layers are preferably transparent polymer film. Preferably, transparent polymer film can be polyvinyl butyral (PVB), ethylene-vinyl acetate (EVA), polymethyl methacrylate (PMMA), a polycarbonate (PC), a polystyrene (PS), a polyvinyl chloride (PVC), a polyamide (PA), a polyetherimide (PEI), a polyethylene terephthalate (PET), a polyurethane, an acrylonitrile butadiene styrene copolymer (ABS), a styrene acrylonitrile copolymer (SAN), a styrene methyl methacrylate copolymer (SMMA) and any mixtures of these, a crosslinked resin, an ionoplast, an ionomer, a cyclo-Olefin copolymer (COC), cyclo-Olefin polymer (COP) or an Optical Clear Adhesive (OCA).

Material of the feeding network can be metal-based material such as Copper, Silver, conductive metal alloys with or without plated material, such as gold, or any other material able to be electrically conductive and able to be placed on a feed interlayer or on a transparent layer.

The transparent antenna arrangement 10 also comprises a ground plane G to ensure good and correct functioning of the antenna system.

The location of the ground plane compared to the patch network and the feeding network is important and can affect significantly the performance of the antenna system.

In some embodiments where the ground plane is located between the patch network and the feeding network, the ground plane comprises at least one optimized shaped and sized slot to get the desired performances.

In some embodiments where the feeding network is located between the patch network and the ground, the at least one optimized shaped and sized slot in the ground plane can be absent.

The choice of the configuration is a compromise between complexity and performance.

The ground plane can be printed, glued, coated on a dielectric panel, on a ground interlayer or on a transparent layer or placed by any other methods able to non-removably place a ground plane on a dielectric panel, on a ground interlayer or on a transparent layer such as screen-printing, inkjet printing, deposition, glued wire, copper foil, copper mesh, etc.

In some embodiments, the ground plane is separated by at least one ground interlayer to the second transparent dielectric panel.

In some embodiments, the ground interlayer can be a space filled of gas, such an air gap. The ground plane can be printed, glued, coated on a third transparent dielectric panel or placed by any other methods able to non-removably place a ground plane on a dielectric panel such as screen-printing, inkjet printing, deposition, glued wire, copper foil, copper mesh, etc. In some embodiments, the ground plane can attached and separated by at least one ground interlayer to the third transparent dielectric panel.

In some embodiments, the ground plane is attached and separated by at least one ground interlayer to a third transparent dielectric panel. In such embodiments, the ground interlayer can be a transparent polymer interlayer. In some embodiments, the fourth retaining means can be comprises on the antenna housing to retain the third transparent dielectric panel.

The ground plane can printed, glued, coated on a transparent layer to facilitate the attachment to the second or a third transparent dielectric panel with the ground interlayer and the handling. Such transparent layers are preferably transparent polymer film. Preferably, transparent polymer film can be polyvinyl butyral (PVB), ethylene-vinyl acetate (EVA), polymethyl methacrylate (PMMA), a polycarbonate (PC), a polystyrene (PS), a polyvinyl chloride (PVC), a polyamide (PA), a polyetherimide (PEI), a polyethylene terephthalate (PET), a polyurethane, an acrylonitrile butadiene styrene copolymer (ABS), a styrene acrylonitrile copolymer (SAN), a styrene methyl methacrylate copolymer (SMMA) and any mixtures of these, a crosslinked resin, an ionoplast, an ionomer, a cyclo-Olefin copolymer (COC), cyclo-Olefin polymer (COP) or an Optical Clear Adhesive (OCA).

Material of the ground plane can be metal-based material such as Copper, Silver, conductive metal alloys with or without plated material, such as gold, or any other material able to be electrically conductive and able to be placed on a ground interlayer or on a transparent layer.

In some preferred embodiments, as for the patch network and the feeding network, to ensure the conductivity and transparency, the ground plane can be designed using a Cu-mesh on the top of a transparent layer such as a PET layer.

In some embodiments, other transparent layers can be used to separate, to assemble and to laminate at least the patch network, the feeding network and/or the ground plane to the first and/or the second transparent dielectric panel and/or a third transparent dielectric panel if exists. These layers are preferably transparent polymers.

Preferably, the transparent layers are low-loss transparent layers to reduce the losses of the antenna arrangement while increasing performances.

Coming back to FIG. 1, according to one embodiment, the transparent antenna arrangement 10 comprises a patch network P attached to and separated from the first transparent dielectric panel 11, a glass panel, by a patch interlayer Ip. The patch interlayer is a COC or a COP. A PET layer 201 then a COP layer 202 and a glass layer 203 is attached to the patch network P to facilitate the handling and to protect the patch network P. The patch network P is laminated on the first transparent dielectric panel 11 with patch interlayer Ip and the layers 201, 202 with the glass panel 203.

In this embodiment, the patch network P, the feeding network F and the ground plane G are individually assembled on a transparent layer 201, 207, 208 to facilitate the attachment to the corresponding transparent dielectric panel. Preferably, these transparent layers are PET layers.

In this embodiment, the transparent antenna arrangement 10 comprises a feeding network F attached to and separated by from the second transparent dielectric panel 12 at a feed interlayer If and a PET layer 207. The feed interlayer If is a cyclo-Olefin polymer. The ground plane G is attached to the second transparent dielectric panel 12 by a ground interlayer Ig. The ground plane G is located between the feeding network F and the first transparent dielectric panel 11. There is a PET layer 207 between the ground interlayer Ig and the feeding network F, meaning that the feeding network F is laminated between the feed interlayer If and the PET layer 207. To protect the ground plane G and the feeding network F, a PET layer 208, a COP layer 206 and a glass layer 205 is attached to the second transparent dielectric panel 12. The feeding network F and the ground plane G are laminated together with the feed interlayer If, and by the ground interlayer Ig to the second transparent dielectric panel 12. In such embodiment, when the ground plane G is positioned between the feeding network and the patch network, the ground plane comprises at least one slot.

This is understood that PET layers 201, 207, 208, COP layers 202, 206 and/or glass layer 203, 205 can be absent or made with another composition.

The first 11 and the second 12 transparent dielectric panels are separated by a panel interlayer 204. The panel interlayer 204 is a space filled by a gas, preferably an air gap. The thickness of the air gap is defined to optimize a minimal distance to increase the coupling performances between the patch network and the feeding network and a maximal distance to increase the wide band performances of the antenna arrangement.

Table 1 illustrates an embodiment with specific thicknesses, in millimeters and measured in the normal direction of the main surface, of the different layers illustrated in FIG. 1 optimizing the reception and/or the transmission of the antenna system for LTE B1 and LTE B3. It is understood that different thickness values can be used for the same bands or for different bands. The distance Dpf is defined between the patch network and the feeding network.

TABLE 1

| Layer | Thickness [mm] |
|---|---|
| 11 | 2.0 |
| Ip | 0.4 |
| P | 0.1 |
| 201 | 0.1 |
| 202 | 0.4 |
| 203 | 0.7 |
| 204 | 4.8 |
| 205 | 0.7 |
| 206 | 0.4 |
| 207 | 0.1 |
| G | 0.1 |
| Ig | 0.8 |
| F | 0.1 |
| 208 | 0.1 |
| If | 0.4 |
| 12 | 1.1 |

In this embodiment, the distance Dpf equals to 8.5 mm. This distance Dpf can be adapted by modifying the air gap 204 and/or reducing or removing other layers between the patch network P and the feeding network F. In such configuration, when the panel interlayer 204 is an air gap, the distance Dpf can be adapted even if the antenna arrangement is mounted on a window. Thus, even if the operating frequency changes, the distance Dpf can be adapted to optimize the transmission and/or the reception of an antenna arrangement mounted or to be mounted on a window. A distance Dpg between the patch network and the ground plane is also defined. In this embodiment, the distance Dpg equals to 7.6 mm.

Figure 2:
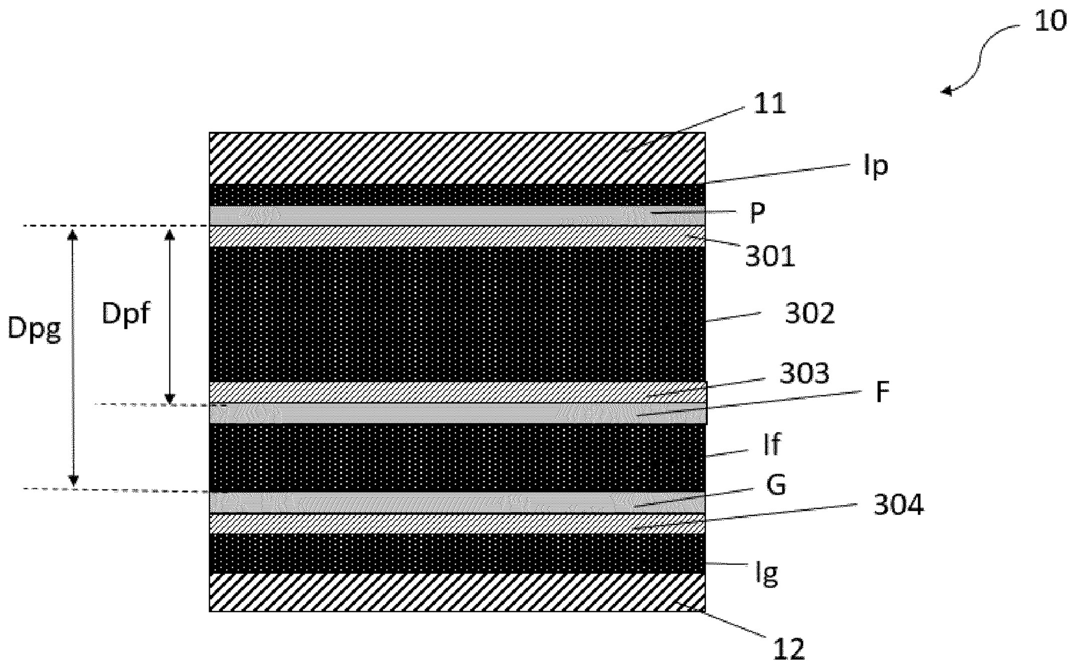
FIG. 2 is a schematic sectional view of antenna arrangement according to a second embodiment of the invention.

FIG. 2 shows an another embodiment of an antenna arrangement 10 of an antenna system according to the invention.

The first 11 and the second 12 transparent dielectric panels are separated by a panel interlayer 302. The panel interlayer 302 is a transparent polymer interlayer, a cyclo-Olefin polymer meaning that the first and the second first 11 and the second 12 transparent dielectric panels are laminated together by the panel interlayer 302. The thickness of the panel interlayer is defined to optimize a minimal distance to increase the coupling performances between the patch network and the feeding network while a maximal distance to increase the wide band performances of the antenna arrangement.

In this embodiment, the ground plane G is located between the feeding network F and the second transparent dielectric panel 12.

The patch network P, the feeding network F and the ground plane G are individually assembled on a transparent layer 301, 303, 304. Preferably these transparent layers are PET layers. The patch network P is attached to the first transparent dielectric panel 11 by the patch interlayer Ip. PET layers with the part of the antenna arrangement, the patch network, the feeding network or the ground plane, are laminated together with the first 11 and the second 12 transparent dielectric panels with interlayers and layers with the patch network, the feed, the ground and the panel interlayers meaning that the patch network P, the feeding network F and the ground plane G are laminated together between the first 11 and the second 12 transparent dielectric panels with respectively the patch network, the feed and the ground interlayers and layers.

Table 2 illustrates a embodiment with specific thicknesses, in millimeters and measured in the normal direction of the main surface, of the different layers illustrated in FIG. 2 optimizing the reception and the transmission of the antenna system for LTE B42, LTE B43, 5G NR n77 and/or 5G NR n78. It is understood that different thickness values can be used for the same bands or for different bands.

TABLE 2

| Layer | Thickness [mm] |
|---|---|
| 11 | 1.1 |
| Ip | 0.4 |
| P | 0.1 |
| 301 | 0.1 |
| 302 | 1.6 |
| 303 | 0.1 |
| F | 0.1 |
| If | 0.8 |
| G | 0.1 |
| 304 | 0.1 |
| Ig | 0.4 |
| 12 | 1.1 |

In this embodiment, the distance Dpf equals 1.8 mm. This distance Dpf can be adapted by modifying the panel interlayer 302 and/or reducing or removing other layers between the patch network P and the feeding network F. In such configuration, when the antenna arrangement is assembled, the distance Dpf cannot be adapted even if the antenna arrangement is mounted on a window because thicknesses of interlayer and layers are fixed during the assembling step. A distance Dpg between the patch network and the ground plane is also defined. In this embodiment, the distance Dpg equals to 2.7 mm.

Preferably, the panel interlayer 302 is made with several polymer interlayers to obtain the wanted thickness. Preferably, the panel interlayer comprises four layers having a thickness of 0.76 mm. Then the distance Dpf equals 3.4 mm.

In some embodiments, the thicknesses of the first and the second transparent dielectric panels can be different. The thickness can depend of the composition to increase the antenna system efficiency.

In some embodiments, when the first and the second dielectric panels are glass panels, the thicknesses are equal to or higher than 0.05 mm, preferably the thicknesses are equal to or higher than 0.5 mm and more preferably the thicknesses are equal to or higher than 1 mm, and the thicknesses are equal to or smaller than 4 mm, preferably the thicknesses are equal to or smaller than 3 mm, and more preferably the thicknesses are equal to or smaller than 2 mm.

According to the invention, the antenna arrangement can be mounted on a window. The window can be a window used as a window to close an opening of the stationary object, such as a building, or to close an opening of the mobile object, such as a train, a boat, etc.

Windows are usually multi-glazed windows to increase thermal performances of the window.

The multi-glazed window can be at least partially transparent to visible waves for visibility, and natural or artificial light. The multi-glazed window is made of multiple panels separated by at least one interlayer, forming multiple interfaces. The panels therefore can be separated by a space filled with gas and/or by a polymeric interlayer.

In some embodiments, the multi-glazed window can comprise at least two glass panels separated by a spacer allowing to create a space filled by a gas like Argon to improve the thermal isolation of the multi-glazed window, creating an insulating multi-glazed window. The invention is not limited to apparatus for use on multi-glazed window having two panels. The apparatus and method of the present invention are suitable for any multi-glazed window such as double, triple glazed windows.

In some embodiments, the glass panel can be a laminated multi-glazed window such as those to reduce the noise and/or to ensure the penetration safety. The laminated glazing comprises panels maintained by one or more interlayers positioned between glass panels. The interlayers are typically polyvinyl butyral (PVB) or ethylene-vinyl acetate (EVA) for which the stiffness can be tuned. These interlayers keep the glass panels bonded together even when broken in such a way that they prevent the glass from breaking up into large sharp pieces.

Said panels of the multi-glazed window can be made of glass, polycarbonate, PVC or any other material used for a window mounted on a stationary object or on a mobile object.

Usually, the material of the panels of multi-glazed window is, for example, soda-lime silica glass, borosilicate glass, aluminosilicate glass or other materials such as thermoplastic polymers or polycarbonates which are especially known for automotive applications. References to glass throughout this application should not be regarded as limiting.

The multi-glazed window can be manufactured by a known manufacturing method such as a float method, a fusion method, a redraw method, a press molding method, or a pulling method. As a manufacturing method of the multi-glazed window, from the viewpoint of productivity and cost, it is preferable to use the float method.

Each panel can be independently processed and/or colored, . . . and/or have different thickness in order to improve the aesthetic, thermal insulation performances, safety, . . . . The thickness of the multi-glazed window is set according to requirements of applications.

The multi-glazed window can be any known window used in situ. For example, the multi-glazed window can be processed, ie annealed, tempered, . . . to respect the specifications of security and anti-thief requirements. The window can independently be a clear glass or a colored glass, tinted with a specific composition of the glass or by applying an additional coating or a plastic layer for example. The window can have any shape to fit to the opening such as a rectangular shape, in a plan view by using a known cutting method. As a method of cutting the multi-glazed window, for example, a method in which laser light is irradiated on the surface of the multi-glazed window to cut the multi-glazed window, or a method in which a cutter wheel is mechanically cutting can be used. The multi-glazed window can have any shape in order to fit with the application, for example a windshield, a sidelite, a sunroof of an automotive, a lateral glazing of a train, a window of a building, . . . .

The shape of the multi-glazed window in a plan view is usually a rectangle. Depending of the application, the shape is not limited to a rectangle and may be a trapeze, especially for a windshield or a backlite of a vehicle, a triangle, especially for a sidelight of a vehicle, a circle or the like.

In addition, the multi-glazed window can be assembled within a frame or be mounted in a double skin façade, in a carbody or any other means able to maintain a multi-glazed window. Some plastics elements can be fixed on the multi-glazed window to ensure the tightness to gas and/or liquid, to ensure the fixation of the multi-glazed window or to add external element to the multi-glazed window. In some embodiments, a masking element, such as an enamel layer, can be added on part of the periphery of the multi-glazed window.

For thermal comfort inside the stationary object or mobile object, a coating system can be present on one interface of the multi-glazed window. This coating system generally uses a metal-based layer and infrared light is highly refracted by this type of layer. Such coating system is typically used to achieve a to a low-energy multi-glazed window.

In some embodiment, the coating system can be a heatable coating applied on the multi-glazed window to add a defrosting and/or a demisting function for example and/or to reduce the accumulation of heat in the interior of a building or vehicle or to keep the heat inside during cold periods for example. Although coating system are thin and mainly transparent to eyes.

Usually, the coating system is covering most of the surface of the interface of the multi-glazed window.

The coating system can be made of layers of different materials and at least one of these layers is electrically conductive. In some embodiments, for example in automotive windshields, the coating system can be electrically conductive over the majority of one major surface of the multi-glazed window. This can causes issues such as heated point if the portion to be decoating is not well designed.

A suitable coating system is for example, a conductive film. A suitable conductive film, is for example, a laminated film obtained by sequentially laminating a transparent dielectric, a metal film, and a transparent dielectric, ITO, fluorine-added tin oxide (FTO), or the like. A suitable metal film can be, for example, a film containing as a main component at least one selected from the group consisting of Ag, Au, Cu, and Al.

The coating system may comprise a metal based low emissive coating system. Such coating systems typically are a system of thin layers comprising one or more, for example two, three or four, functional layers based on an infrared radiation reflecting material and at least two dielectric coatings, wherein each functional layer is surrounded by dielectric coatings. The coating system of the present invention may in particular have an emissivity of at least 0.010. The functional layers are generally layers of silver with a thickness of some nanometers, mostly about 5 to 20 nm. The dielectric layers are generally transparent and made from one or more layers of metal oxides and/or nitrides. These different layers are deposited, for example, by means of vacuum deposition techniques such as magnetic field-assisted cathodic sputtering, more commonly referred to as "magnetron sputtering". In addition to the dielectric layers, each functional layer may be protected by barrier layers or improved by deposition on a wetting layer.

In some embodiments, to maximize the transmission and the reception of the antenna system in front of a window having a coating system, a decoated portion can be made in front of the antenna to alleviate attenuation due to the coating system.

According to the invention, defining the configuration of the window means knowing the assembly, composition of the window if a coating system and/or a decoating area exists in order to estimate and/or calculate the level of degradation of the electromagnetic signal to adapt the distance Dpf to optimize the transmission and/or the reception of an antenna arrangement.

Preferably, the distance Dpf, the distance Dpg and the distance between the installation interface and the window, in embodiments where a installation interface is present, are adapted to optimize the transmission and/or the reception of an antenna arrangement.

In some embodiments, the distance Dpf is made during the assembling of the antenna assembly by defining thickness of components of the antenna arrangement such as interlayers and/or layers such as the distance Dpg.

The antenna arrangement can be mounted on the window and then the distance Dpf, and/or the distance Dpg, can be adapted by modifying the thickness of the air gap.

An embodiment provides a method to assemble an antenna arrangement according to the first aspect. The assembling method comprises following steps:

A. assembling the patch network on the first transparent dielectric panel,
B. assembling the feeding network on the second transparent dielectric panel.
C. Assembling the first transparent dielectric panel and the second transparent dielectric panel together with a panel interlayer.

In some embodiments, preferably when the panel interlayer is space filled with gas, steps A and B can be made independently in any order, then the first transparent dielectric panel and the second transparent dielectric panel are assembled together with a panel interlayer.

In some embodiments, components of the antenna arrangement are placed and laminated together in an order to optimize the assembling while minimizing the handling.

An embodiment provides a use of an antenna arrangement according to the first aspect in front of a window to optimize the transmission and/or the reception of the radio-frequency signal.

The invention claimed is:

1. An antenna arrangement comprising:
a first transparent dielectric panel;
a second transparent dielectric panel in front of the first transparent dielectric panel and separated by at least one panel interlayer from the first transparent dielectric panel;
a patch network attached and separated by at least one patch interlayer from the first transparent dielectric panel;
a feeding network attached and separated by at least one feed interlayer from the second transparent dielectric panel defining a distance Dpf between the patch network and the feeding network; and
a ground plane,
wherein the at least one patch interlayer is a transparent polymer interlayer, and
wherein the ground plane is located between the feeding network and the second transparent dielectric panel.

2. The antenna arrangement according to claim 1, wherein the ground plane is separated by at least one ground interlayer from the second transparent dielectric panel.

3. The antenna arrangement according to claim 1, wherein the ground plane is located between the feeding network and the first transparent dielectric panel.

4. The antenna arrangement according to claim 1, wherein the at least one panel interlayer is a transparent polymer interlayer.

5. The antenna arrangement according to claim 1, wherein the at least one panel interlayer is a space filled by a gas.

6. The antenna arrangement according to claim 1, wherein the first and/or the second transparent dielectric panel comprises a glass panel.

7. A method to assemble an antenna arrangement according to claim 1, comprising:
A. assembling the patch network on the first transparent dielectric panel,
B. assembling the feeding network on the second transparent dielectric panel, and
C. assembling the first transparent dielectric panel and the second transparent dielectric panel together with a panel interlayer.

8. An antenna arrangement comprising:
a first transparent dielectric panel;
a second transparent dielectric panel in front of the first transparent dielectric panel and separated by at least one panel interlayer from the first transparent dielectric panel;
a patch network attached and separated by at least one patch interlayer from the first transparent dielectric panel;
a feeding network attached and separated by at least one feed interlayer from the second transparent dielectric panel defining a distance Dpf between the patch network and the feeding network; and
a ground plane,
wherein the at least one patch interlayer is a transparent polymer interlayer, and
wherein the ground plane is located between the feeding network and the first transparent dielectric panel.

9. The antenna arrangement according to claim 8, wherein the ground plane is separated by at least one ground interlayer from the second transparent dielectric panel.

10. The antenna arrangement according to claim 8, wherein the ground plane is located between the feeding network and the second transparent dielectric panel.

11. The antenna arrangement according to claim 8, wherein the at least one panel interlayer is a transparent polymer interlayer.

12. The antenna arrangement according to claim 8, wherein the at least one panel interlayer is a space filled by a gas.

13. The antenna arrangement according to claim 8, wherein the first and/or the second transparent dielectric panel comprises a glass panel.

14. A method to assemble an antenna arrangement according to claim 8, comprising:
A. assembling the patch network on the first transparent dielectric panel,
B. assembling the feeding network on the second transparent dielectric panel, and
C. assembling the first transparent dielectric panel and the second transparent dielectric panel together with a panel interlayer.

15. An antenna arrangement comprising:
a first transparent dielectric panel;
a second transparent dielectric panel in front of the first transparent dielectric panel and separated by at least one panel interlayer from the first transparent dielectric panel;
a patch network attached and separated by at least one patch interlayer from the first transparent dielectric panel;
a feeding network attached and separated by at least one feed interlayer from the second transparent dielectric panel defining a distance Dpf between the patch network and the feeding network; and
a ground plane,
wherein the at least one patch interlayer is a transparent polymer interlayer, and
wherein the at least one panel interlayer is a transparent polymer interlayer.

16. The antenna arrangement according to claim 15, wherein the ground plane is separated by at least one ground interlayer from the second transparent dielectric panel.

17. The antenna arrangement according to claim 15, wherein the ground plane is located between the feeding network and the second transparent dielectric panel.

18. The antenna arrangement according to claim 15, wherein the ground plane is located between the feeding network and the first transparent dielectric panel.

19. The antenna arrangement according to claim 15, wherein the at least one panel interlayer is a space filled by a gas.

20. The antenna arrangement according to claim 15, wherein the first and/or the second transparent dielectric panel comprises a glass panel.

21. A method to assemble an antenna arrangement according to claim 15, comprising:
A. assembling the patch network on the first transparent dielectric panel,
B. assembling the feeding network on the second transparent dielectric panel, and
C. assembling the first transparent dielectric panel and the second transparent dielectric panel together with a panel interlayer.

* * * * *